Aug. 12, 1941. J. J. CANTOR 2,252,164
VACUUM BREAKER
Filed July 28, 1939
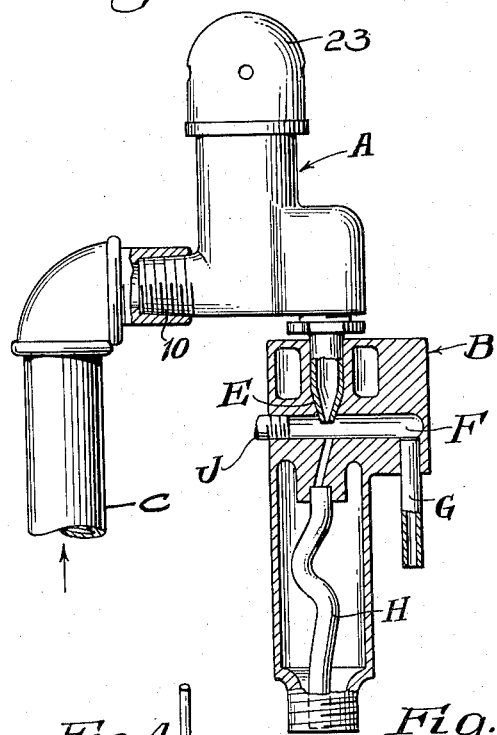
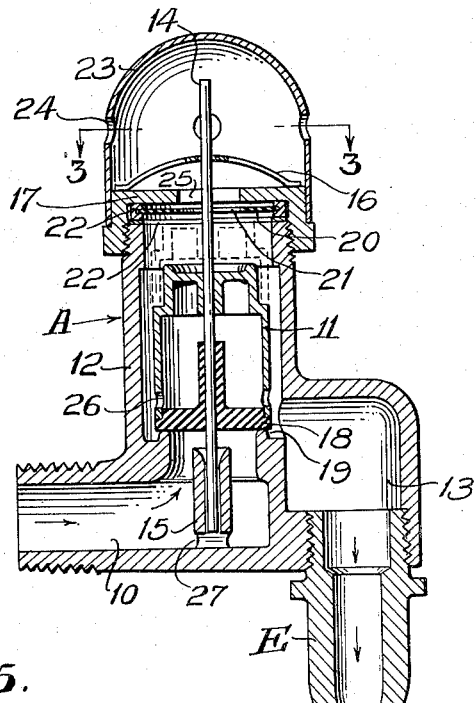
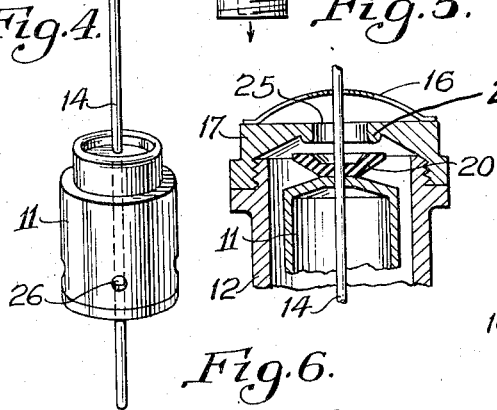
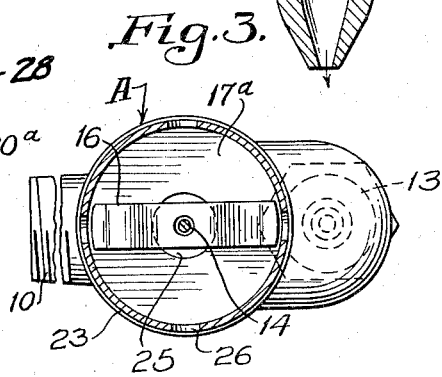
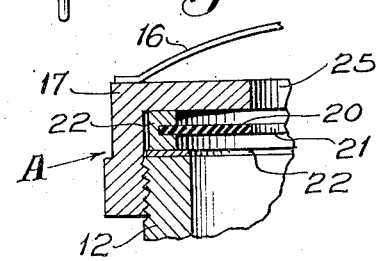
INVENTOR.
Jacob J. Cantor
BY
ATTORNEY.

Patented Aug. 12, 1941

2,252,164

UNITED STATES PATENT OFFICE 2,252,164

VACUUM BREAKER

Jacob J. Cantor, Los Angeles, Calif.

Application July 28, 1939, Serial No. 287,033

4 Claims. (Cl. 137—69)

This invention relates to fluid flow control devices, and more specifically to a device capable of automatically breaking a vacuum in a system and preventing back siphonage therein.

In vacuum breaking devices as heretofore developed, a gravity or spring controlled movable valve member is employed for the purpose of preventing back siphonage of fluids or liquids into the water supply system, and also for breaking any vacuum developing in the system. Such arrangements permit air leakage into the system, especially when low water pressures are employed which are varying or pulsating in character. Since the specific gravity of these valve members is greater than that of water, reliance is placed upon the flow velocity of the liquid to hold them open to the passage of the water and at the same time in engagement with an atmospheric valve seat to prevent air from passing into the system. However, variations in the rate of water flow produce a vibration of this type of movable valve member, intermittently opening the device to atmospheric air, and in some instances allowing the liquid or water to escape through the air opening.

It is an object of the present invention to avoid the aforementioned difficulties by employing a float valve, in lieu of one of the gravity type, so that reliance need not be placed on the velocity of the water to close the atmospheric air opening. Instead, the float valve is dependent upon the level of the water within the vacuum breaking device for holding it in either open or closed position with respect to the air inlet passage. That is, the present invention contemplates the utilization of a float valve having a specific gravity less than that of the liquid passing through the system.

It is a further object of the invention to provide an improved flow control device or vacuum breaker for preventing back siphonage into the water supply lines.

A further object of the invention is to provide a vacuum breaker embodying a float valve controlling an atmospheric opening, and which has a relatively wide range of movement under the influence of water passing through the device while maintaining the atmospheric opening closed.

Still another object of the invention is to provide a vacuum breaker embodying a float valve of such character as to resist distortion and prevent its destruction under the influence of liquids under pressure passing through the device.

Other objects and advantages of the invention will become apparent from a consideration of several forms in which it is embodied. These forms are illustrated in the drawing, wherein:

Fig. 1 is a partial elevational and partial sectional view of the invention shown in conjunction with an aspirator adapted for hospital use.

Fig. 2 is a longitudinal section through the vacuum breaker shown in elevation in Fig. 1;

Fig. 3 is a section taken along the line 3—3 of Fig. 2;

Fig. 4 is a perspective view of the movable float employed in the vacuum breaking device; and Fig. 5 is a partial section of a modified form of vacuum breaker device.

Fig. 6 is an enlarged sectional detail of the flexible valve seat construction as shown in Fig. 2.

The vacuum breaker A is disclosed in combination with an aspirator B water entering the inlet 10 of the vacuum breaker from a suitable source of supply through the inlet pipe C and exiting through an aspirator nozzle E having a restricted end so that increase in velocity of the water as it passes through this end will create a suction in the chamber F and suck or exhaust matter from a patient or other source (not shown) through the aspirator tube G the water and suction products passing together through the outlet pipe H to a suitable drain. If desired, a gauge (not shown) can be placed in communication with the chamber by a threaded tube J to indicate the degree of suction therein.

Back siphonage to the water supply is prevented and breaking of any vacuum that might develop is accomplished by a bouyant float valve 11 movable within the vacuum breaker housing 12 to control the passage of liquids between the inlet 10 and the outlet chamber 13, and also the passage of air into the chamber. This buoyant valve 11 is of generally cylindrical shape and is attached to a guide rod 14 slidably received within a lower guide 15 fixed to or integral with the housing and to an upper guide 16 in the form of a strip soldered or otherwise secured to a clamp ring 17.

The float valve is of hollow construction, being formed primarily of a resinous material or the like, such as "Bakelite," its lower portion 18 being made of rubber adapted to contact a valve seat 19 to prevent passage of liquids in a reverse direction from the chamber 13 to the water inlet 10. Due to its light construction, the float valve will rise upon the water or other liquid when it is passing in a proper direction from the inlet to the outlet chamber 13, and be moved thereby into engagement with a flexible seat 20 to close an atmospheric opening 21 through which air can pass whenever a vacuum tends to develop in the chamber 13 or when the liquid level therein falls sufficiently.

The flexible seat 20 is formed of rubber or the like, being carried within a metal retainer ring 22 securely held upon the housing by the clamp ring 17 threadedly secured to the housing (see Fig. 6). A gasket 22 is interposed between the ring and the housing to guard against leakage when the float valve 11 is engaged with the flexible seat 20. By this arrangement, the rubber seat is held in proper assembled relation by the clamp ring 17 without being subjected to distortion incident to the clamping action.

A cap 23 encloses the upper portion of the device by being fitted over the clamp ring. It is provided with openings 24 permitting air to pass into the device around the guide strip 16 and through a central atmospheric opening 25 provided within the terminal portion of the ring 17, and thence through the opening 21 in the flexible seat into the chamber 13.

In the operation of the device, water will flow through the inlet 10 and into the chamber 13 by unseating the float valve 11 and causing it to rise into engagement with the flexible seat 20 to close the atmospheric air opening 21. Whatever air is present will be trapped and compressed at the upper portion of the chamber. Since the float valve is of hollow and light construction, it would be subject to distortion due to the pressure within the chamber. However, in the specific construction shown in the drawing, distortion is obviated and the pressures withstood by forming communicating openings 26 in the outer wall of the float allowing water to enter the float and compress air therein as the liquid rises. This increased internal pressure will counterbalance the effects of the compressed air without the float and prevent a pressure differential from distorting it and effecting its uniform seating against the flexible seat.

The flexible seat 20 is provided so as to permit the float valve 11 to have a relatively wide range of movement without opening the device to atmospheric pressure. Thus, as the float rises or falls depending upon the fluid level in the device, the flexible seat will yield to allow the float to remain in intimate engagement with the flexible seat.

It is therefore seen that the device is not dependent upon the velocity of liquid flow to close the atmospheric openings, 21, 25, but due to the lower specific gravity of the float as compared to water, or whatever other liquid is used, it will be elevated into contact with the flexible seat to close those openings. Variations in the rate of water flow or pulsations will have no effect upon its ability to prevent leakage from the device as is encountered with gravity or spring types of valves. However, should a vacuum tend to develop in the chamber 13, the greater atmospheric pressure of the air will immediately unseat the float, to break the vacuum, which action will be assisted by the lowering of the fluid level within the chamber 13 and inlet 10, and also by the reverse flow tendency of the liquid from the chamber to the inlet. The valve will thereupon engage its lower seat 19 to positively prevent reverse flow of fluids to the inlet 10.

It will be noted that the lower guide 15 is provided with an opening 27, which will not only permit sediment to be cleaned from the guide by the flow of water, but it also exposes the lower end of the guide rod 14 to the action of water under pressure, adding its area to the surface available for raising the float against the flexible seat 20, and equalizing the pressure around the rod, whereby movement of the float 11 is not interfered with by its pulling against a vacuum within the lower guide, which might develop were its lower end closed.

A modified form of device is disclosed in Fig. 5. Instead of the flexible seat 20 being fixed with respect to the housing, it is secured to the upper end of the buoyant float valve 11 for engagement with its cooperable sealing member 28 provided on the clamp ring 17. This flexible member 20a is of general cup or dish shape, permitting it to yield and thereby allowing the float to have a range of movement without disrupting its sealing contact, by virtue of which the atmospheric air opening 25 is held closed.

While the invention has been described with particular reference to the forms shown in the drawing, it is to be understood that they are for illustrative purposes only, and should not be construed as imposing any limitations upon the invention, which is best defined by the claims appended hereto.

I claim:

1. A vacuum breaker, which includes a housing having a liquid inlet and outlet and an atmospheric air inlet, a valve seat between said liquid inlet and outlet, a second flexible yieldable valve seat substantially coaxial with said first valve seat positioned between said air inlet and outlet, a buoyant float valve member responsive to rise in the liquid level in the housing to engage said flexible seat and to fall in said level to engage the first-mentioned valve seat, a rod secured substantially centrally to said member and extending through both seats, upper and lower guides secured to the housing slidably receiving said rod, said float valve member being of hollow thin wall construction and having an opening at its lower portion providing communication between its interior and exterior.

2. A vacuum breaker, which includes a housing having a liquid inlet and outlet and an atmospheric air inlet, a flexible valve seat at said air inlet, a retainer carrying said seat, a clamp ring securing said retainer to said housing, said clamp ring being spaced from said seat to contact it and limit the extent of its yielding movement, and a buoyant float valve member movable by the rise of liquid in said housing into sealing contact with said flexible seat, said seat being yieldable to permit said contact to be maintained despite variations in the liquid level in the housing.

3. A vacuum breaker which includes a housing having a liquid inlet and outlet and an atmospheric air inlet, a completely flexible valve seat at said air inlet, a retainer carrying said seat, a clamping ring securing said retainer to said housing, said clamping ring being spaced from said seat to contact it and to limit the extent of its yielding movement, and a float valve member movable by the rise of liquid in said housing into sealing contact with said flexible seat, said valve seat being free to rise and move in a plurality of directions under the force exerted by the valve when the same is raised whereby the opening in said valve seat will be completely sealed against fluid leakage regardless of the position assumed by the float valve on its closing movement.

4. A vacuum breaker which includes a housing having a liquid inlet and outlet and an atmospheric air inlet, a valve seat formed of a comparatively thin resilient material, a retainer carrying said seat, a clamping ring securing said retainer to said housing, said clamping ring being spaced from said seat to contact it and to limit the extent of its yielding movement, and a float valve member movable by the rise of liquid in said housing into sealing contact with said valve seat, said valve seat being free to move in a plurality of directions under the force exerted by the valve when the same is raised whereby the opening in said valve seat will be completely sealed against fluid leakage regardless of the position assumed by the float valve on its closing movement.

JACOB J. CANTOR.